(12) United States Patent
Shinagawa (10) Patent No.: US 9,430,176 B2
(45) Date of Patent: Aug. 30, 2016

(54) PRINTING APPARATUS, CONTROL METHOD OF THE PRINTING APPARATUS, AND STORAGE MEDIUM

(71) Applicant: CANON KABUSHIKI KAISHA, Tokyo (JP)

(72) Inventor: Kazutaka Shinagawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/099,847

(22) Filed: Dec. 6, 2013

(65) Prior Publication Data

US 2014/0160526 A1    Jun. 12, 2014

(30) Foreign Application Priority Data

Dec. 10, 2012    (JP) .................................. 2012-269396

(51) Int. Cl.
*G06F 3/12* (2006.01)
*G03G 15/20* (2006.01)
*G03G 15/00* (2006.01)

(52) U.S. Cl.
CPC ......... *G06F 3/1296* (2013.01); *G03G 15/2046* (2013.01); *G03G 15/5025* (2013.01)

(58) Field of Classification Search
CPC . G06Q 30/0283; G06F 3/126; G06F 3/1226; G06K 15/1823
USPC ............ 358/1.13, 1.15, 1.16; 705/7.12, 7.22, 705/402, 408; 347/260, 261
See application file for complete search history.

(56) References Cited

U.S. PATENT DOCUMENTS

2004/0227809 A1* 11/2004 Doi et al. ....................... 347/260
2005/0008384 A1*  1/2005 Lee ................................... 399/69
2008/0239366 A1* 10/2008 Cyman et al. ............... 358/1.15
2010/0253968 A1* 10/2010 Nuggehalli .................. 358/1.15

FOREIGN PATENT DOCUMENTS

| CN | 1876386 A | 12/2006 |
|---|---|---|
| JP | 2007-108297 A | 4/2007 |
| KR | 20080069352 A | 7/2008 |
| KR | 20080086301 A | 9/2008 |

* cited by examiner

*Primary Examiner* — Thomas Lett
(74) *Attorney, Agent, or Firm* — Canon USA, Inc. IP Division

(57) ABSTRACT

A printing apparatus sets, as time for performing pre-processing before performing print processing, first time if the printing rate calculated by the calculation unit is smaller than a predetermined value, and second time that is longer than the first time if the printing rate calculated by the calculation unit is larger than the predetermined value.

5 Claims, 7 Drawing Sheets

PRINTING APPARATUS, CONTROL METHOD OF THE PRINTING APPARATUS, AND STORAGE MEDIUM

BACKGROUND OF THE INVENTION

1. Field of the Invention

The present invention relates to a printing apparatus, a method of controlling the printing apparatus, and a storage medium.

2. Description of the Related Art

Image forming apparatuses that employ image forming processes such as an electrophotographic method and an electrostatic recording method are provided. In these apparatuses, a latent image is formed on a photosensitive member, and the latent image is developed with a developer to be visualized as a toner image. The toner image is transferred onto a recording material such as paper, and then, the recording material on which the toner image has been transferred is conveyed to pass through a nip portion formed with a fixing roller and a pressure roller provided in a fixing device. This process heats the toner image to fix it onto the recording material as an image.

In recent years, quick-start on-demand heating devices have been proposed as fixing devices, and have been put into practical use. In such an on-demand heating device, a rotatable endless heat-resistance thin flexible member is slidingly moved toward a heating member to apply the heat of the heating member to the recording material through the flexible member.

In such image forming apparatuses, to increase the productivity, first page out time (FPOT), which is the time necessary from the start of printing to the completion of discharge of a first recording material, is regarded as an important factor. There are many factors for determining the FPOT, and these factors can be roughly categorized into the following four items. The factors are, image information generation and rasterization time by an image information processing unit such as a video controller, rise time of a motor for rotating a scanner mirror in an exposure device, a length of a conveyance path from paper feed to conveyance and a conveying speed, and temperature rise time of a fixing device.

The temperature rise time of the fixing device is a time required for a heating member of a fixing heater provided therein to rise temperature up to a predetermined degree, which can be image-heatable, from the start of power supply to the fixing heater. The temperature rise time of the fixing device has a largest variation in the FPOT variation factors at the image forming apparatus side except an image rasterization time. The temperature rise time varies largely depending on a temperature of an image heating device at a start time of printing, an ambient temperature around the device, a power source voltage and so forth.

Steps of performing engine pre-processing by an engine controller at the printing start includes a pre-rotation control. In the pre-rotation control, in addition to heating processing of the fixing heater of the fixing device, control of the number of rotations of a polygonal mirror, high-pressure control, and transfer preparation are also performed. As a method of reducing the FPOT, a method for reducing the pre-rotation time including the fixing device rise time can be provided. The use of the above-mentioned on-demand heating devices is suitable for the purpose. Too much time reduction, however, causes an insufficient fixing temperature, and as a result, a fixing defect occurs. Consequently, simply reducing the pre-rotation time is not an appropriate method.

For the reduction of the FPOT, for example, Japanese Patent Application Laid-Open No. 2007-108297 proposes a method of changing the timing of recording material conveyance depending on a heating condition of a heating device, a power source voltage, and an ambient temperature. In this method, to ensure the fixation, as the number of disadvantageous conditions is small, the paper feed starts at an earlier stage to shorten the FPOT. On the other hand, as the number of disadvantageous conditions is large, the paper feed starting timing is delayed.

In Japanese Patent Application Laid-Open No. 2007-108297, to shorten the FPOT while reducing the fixing defect, temperature adjustment control is optimized depending on the ambient temperature. In the technique, however, print data is not considered, and to data of blank paper and a solid image, the same pre-rotation time is ensured. In other words, assuming worst conditions, the time enough to fix the solid image is always set. Consequently, it is not always a shortest time for reducing the FPOT while reducing the fixing defect.

SUMMARY OF THE INVENTION

The present invention is directed to shortening FPOT by enabling change in pre-rotation time depending on a printing rate of print data and indirectly optimizing temperature adjustment control while reducing a fixing defect.

The present invention provides a mechanism for reducing time for obtaining first page output in print request by setting a pre-processing time appropriate for a printing rate.

According to an aspect of the present invention, a printing apparatus includes a calculation unit configured to calculate a printing rate for printing based on print data, a setting unit configured to set, as time for performing pre-processing before performing print processing, first time if the printing rate calculated by the calculation unit is smaller than a predetermined value, and second time that is longer than the first time if the printing rate calculated by the calculation unit is larger than the predetermined value, a pre-processing unit configured to perform the pre-processing for the time set by the setting unit, and a printing unit configured to perform the print processing based on the print data after the pre-processing unit has performed the pre-processing.

Further features and aspects of the present invention will become apparent from the following detailed description of exemplary embodiments with reference to the attached drawings.

DESCRIPTION OF THE EMBODIMENTS

Various exemplary embodiments, features, and aspects of the invention will be described in detail below with reference to the drawings.

<Description of System Configuration>
<Configuration of Apparatus>

Figure 1:
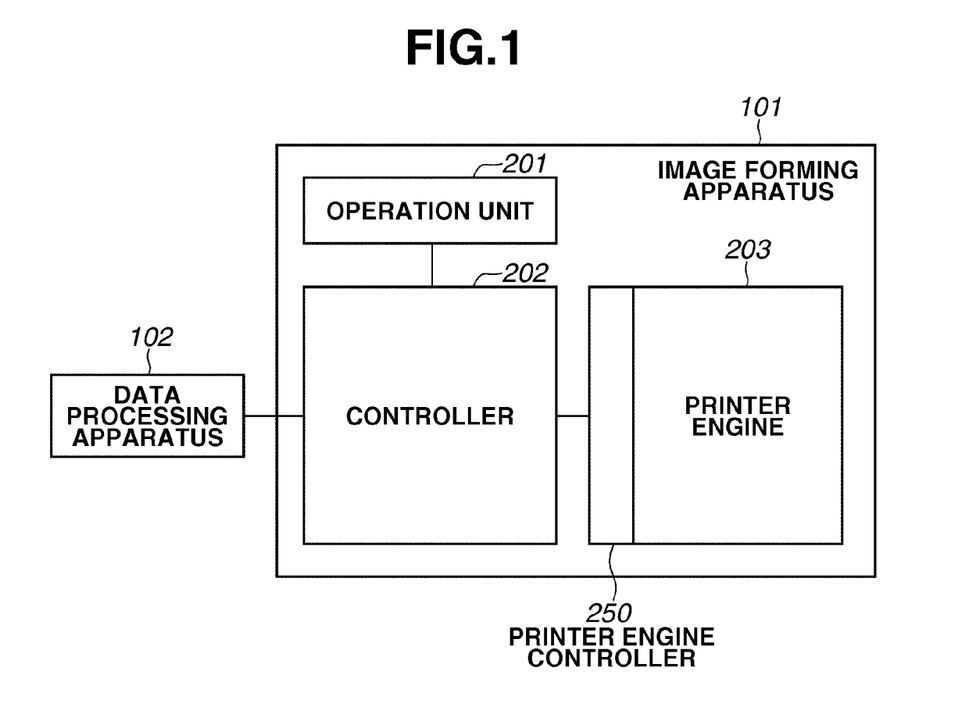
FIG. 1 is a block diagram illustrating a configuration of an image forming apparatus according to an exemplary embodiment of the present invention.

FIG. 1 is a block diagram illustrating a configuration of an image forming apparatus according to an exemplary embodiment of the present invention. In this exemplary embodiment, an example of an image forming apparatus having a controller 202 and a printer engine controller 250, which can bidirectionally communicate with each other, is described.

In FIG. 1, a data processing apparatus 102 is, for example, a computer. The data processing apparatus 102 issues, to the image forming apparatus 101, a print job (for example, print data of page description language (PDL) data is included) and an instruction for a device via a communication interface such as a local area network (LAN). The image forming apparatus 101 includes the following components.

The controller 202 performs overall control of the image forming apparatus by issuing instructions for individual modules. A printer engine 203 outputs a digital image onto a sheet (paper) according to image information shared with the controller 202. A printer engine controller (engine controller) 250 can detect environmental information (humidity and temperature) around the engine with a sensor (not illustrated). Further, the printer engine controller 250 has a function for detecting that the printer engine 203 is in a certain operation state, which will be described below, to notify the controller 202 of the information.

The operation unit 201 is used to operate the image forming apparatus 101. The operation unit 201 includes operation buttons for users for setting the image forming apparatus 101, and a display panel such as a liquid crystal screen that serves as a display unit for presenting various kinds of information in the image forming apparatus 101 for the users.

The image forming apparatus employed in this exemplary embodiment is not limited to the printer, and alternatively, a digital multifunction peripheral having an image forming function can be employed.

Figure 2:
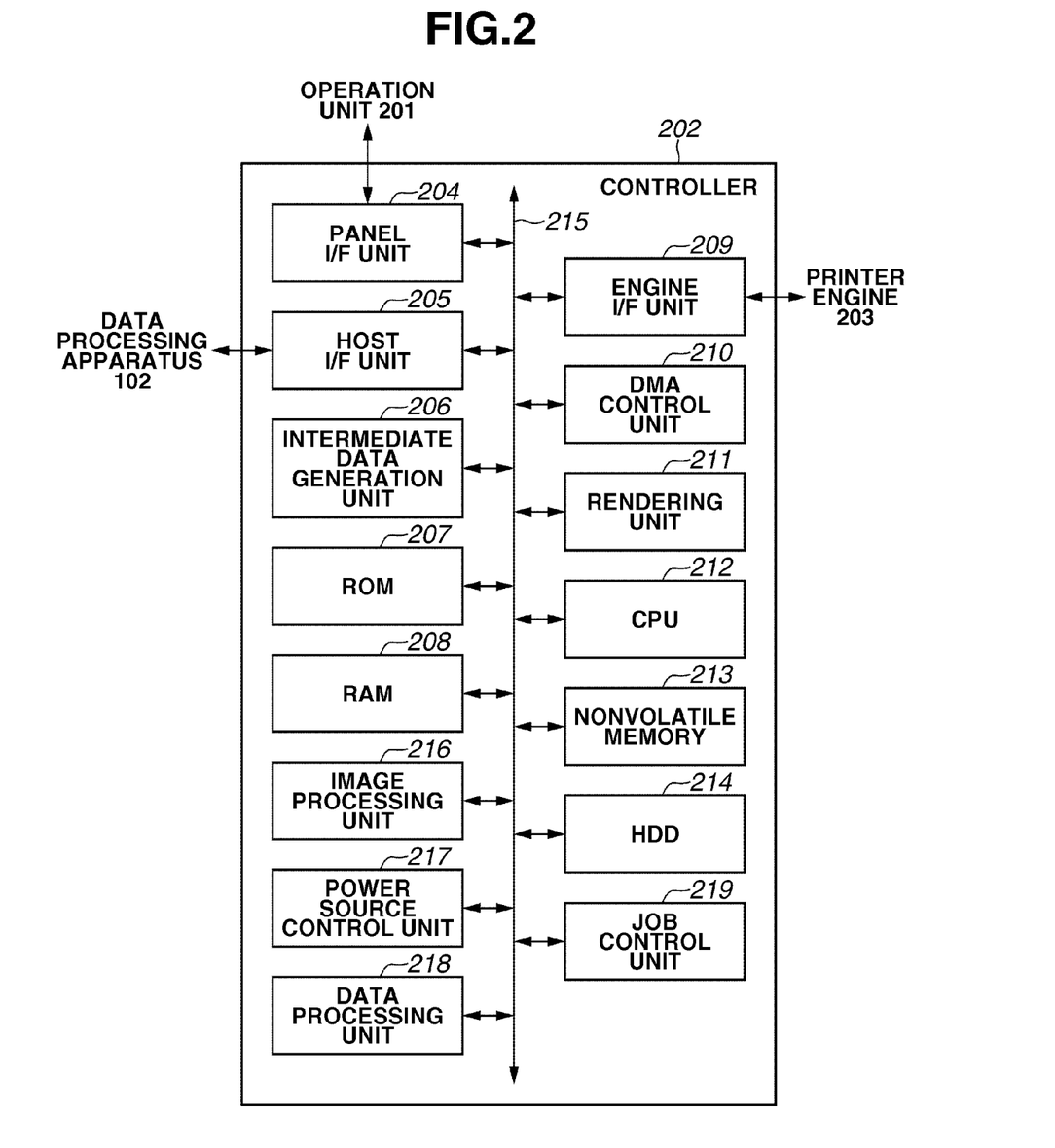
FIG. 2 is a block diagram illustrating a detailed configuration of a controller illustrated in FIG. 1.

FIG. 2 is a block diagram illustrating an example of a configuration of the controller 202 illustrated in FIG. 1. The controller 202 analyzes print data received from the data processing apparatus 102 and issues a print instruction to the printer engine controller 250. Further, the controller 202 can acquire the environmental information and the operational state detected by the printer engine controller 250.

In FIG. 2, a panel interface unit (panel I/F unit) 204 performs data communication with the operation unit 201. Via the panel interface unit 204, a central processing unit (CPU) 212 can check a content that has been set and instructed on the operation unit 201 by the user.

Via a network, a host interface unit (host I/F unit) 205 bi-directionally communicates with the data processing apparatus 102 such as a host computer. The host I/F unit 205 can receive print data sent from the data processing apparatus 102, and store the data in a random access memory (RAM) 208. An intermediate data generation unit 206 converts the print data into intermediate data, which is in a manageable form in the image forming apparatus 101. A read-only memory (ROM) 207 stores various types of processes, which will be described in this exemplary embodiment, and control program codes to be executed by the image forming apparatus 101.

A RAM 208 is used as a work memory for the CPU 212. The RAM 208 stores the intermediate data obtained based on the print data received in the host interface unit 205, bitmap data obtained by rendering processing performed onto the intermediate data, and various temporary processing statuses necessary for processing.

An engine interface unit 209 is connected to the printer engine 203 to communicate with each other. The engine interface unit 209 can issue a print instruction to the printer engine 203 after bitmap data is generated in a rendering unit 211. Further, the engine interface unit 209 monitors a status of the printer engine 203, and notifies the data processing apparatus 102 of the status of the printer engine via the host interface unit 205 as necessary. Furthermore, the engine interface unit 209 notifies the printer engine of a printing rate counted by an image processing unit 216.

In print processing, the engine interface unit 209 issues a print request command to the printer engine 203 and informs a direct memory access (DMA) control unit 210 of the location of the bitmap data stored in the RAM 208.

Then, according to an image transfer synchronization signal from the printer engine 203, the CPU 212 transfers the bitmap data stored in the RAM 208 via the DMA control unit 210 and the engine interface unit 209 to the printer engine 203. The CPU 212 can indirectly perform temperature adjustment control of a fixing heater via the engine interface unit 209, for example, by issuing an instruction for extending pre-rotation to the printer engine 203.

The DMA control unit 210 transfers the bitmap data in the RAM 208 to the engine interface unit 209 according to an instruction from the CPU 212.

The rendering unit 211 reads the intermediate data generated by the intermediate data generation unit 206 from the RAM 208, generates bitmap data to be actually output for printing, and stores the data in the RAM 208. The rendering unit 211 has an image processing processor for performing real-time digital image processing. The CPU 212 controls devices connected to a CPU bus 215 based on a control program code stored in the ROM 207. A nonvolatile memory 213 stores, for example, control information such as a density correction table.

A hard disk drive (HDD) 214 is used to temporarily store print data as expanded image data. With the HDD 214, electronic sorting can be implemented by reading the image data a specified number of times, and secure printing can be implemented. In the secure printing, stored image data is read after user authentication is performed with a preset password, and the data is output for printing.

The CPU bus 215 includes addresses, data, and a control bus. Individual devices 204 to 214 and 216 to 219 can access all devices connected to the CPU bus 215.

An image processing unit 216 performs, in addition to various image processing, calculation of the printing rate after bitmap data generation. A power source control unit 217 can perform control for switching power supply statuses according to a power switch operation or a power-saving setting.

A data processing unit 218 reads reception data stored via the host I/F unit 205 from the RAM 208, analyzes the read data, and registers the data as a job in a job control unit 219. Further, the data processing unit 218 converts the reception data into intermediate data, and stores the data in the RAM 208.

The job control unit 219 performs registration, deletion, suspension, and resumption of jobs. Further, the job control unit 219 issues an operation instruction to a related software module according to the content of a job to control hardware to implement a printing operation. The job control unit 219 can store a job history in the nonvolatile memory 213 at a job completion or at a job deletion.

<Operation of Printer Engine>

Hereinafter, operation of the printer engine 203 according to the exemplary embodiment of the present invention is described.

Figure 3:
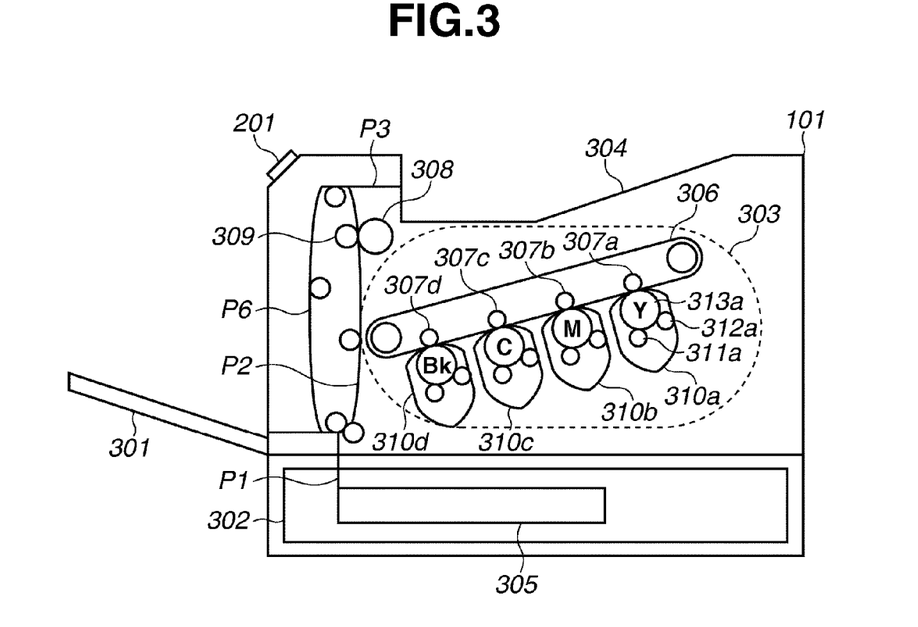
FIG. 3 is a cross-sectional view illustrating a structure of the image forming apparatus illustrated in FIG. 1.

FIG. 3 is a cross-sectional view illustrating a structure of the image forming apparatus 101 illustrated in FIG. 1.

In FIG. 3, the image forming apparatus 101 includes two sheet feeding units of a sheet feed tray 301 and a sheet cassette 302, a discharge tray 304, an image forming unit 303 for performing an electrophotographic process, the image forming unit 303 being surrounded by the broken line in the drawing, and a fixing device including a fixing roller 308 and a pressure roller 309. Temperature adjustment control can be performed to the fixing roller 308 through a fixing heater (not illustrated).

A sheet 305 is conveyed, in one-sided printing, from the sheet cassette 302, in the order of P1, P2, and P3 as a conveyance path. In two-sided printing, the sheet 305 is conveyed in the order of P1, P2, and P3, and after P3, the conveyance path is switched back. Then, the sheet 305 is further conveyed in the order of P6, P2, and P3, and discharged outside the apparatus.

Hereinafter, units in the image forming unit 303 are described.

Toner cartridges 310a, 310b, 310c, and 310d respectively contain development materials of individual colors. In this example, toner cartridges of yellow, magenta, cyan, and black are stored at illustrated positions.

For example, the toner cartridge 310a includes a charger having a charging roller 311a, a development unit having a development roller 312a, and a photosensitive drum 313a. The charger is a unit for forming a latent image of an image transmitted from the controller 202 (not illustrated) on the photosensitive drum 313a. The development unit is used to apply black toner onto the photosensitive drum on which the latent image has been formed to develop the image.

Control of the printer engine 203 in one-sided printing is described.

The printer engine 203, according to an instruction from the controller 202, sequentially develops the image data transmitted from the controller 202 on photosensitive drums 313a, 313b, 313c, and 313d, and sequentially transfers the images onto an intermediate transfer belt 306. Simultaneously with the operation, the printer engine 203 feeds a sheet from the sheet cassette 302, and performs control such that the primarily transferred toner images on the intermediate transfer belt 306 are secondarily transferred onto the sheet being conveyed via P1 to P2.

The printer engine 203 conveys the sheet on which the toner image has been transferred at P2 to the fixing device having the fixing roller 308 and the pressure roller 309 to fix the toner image onto the sheet. Lastly, the printer engine 203 discharges the sheet on which the toner image has been fixed via P3 to the outside of the apparatus.

Hereinafter, a separation operation is described.

Separation mechanisms are respectively provided between the photosensitive drum 313a and a transfer roller 307a, between the development roller 312a and the photosensitive drum 313a, between the charging roller 311a and the photosensitive drum 313a, and between the fixing roller 308 and the pressure roller 309.

In a color printing device, in a case where monochromatic printing in which only black toner is used is performed, to reduce wear in the photosensitive drums other than black, normally, the printer engine 203 drives the separation mechanisms between the photosensitive drums 313a to 313c and the charging rollers 311a to 311c contacting with the photosensitive drums, the development rollers 312a to 312c, and the intermediate transfer belt 306 to set the individual components from the connected state to the separated state respectively.

In a power-off state or in a power-saving mode for turning off the printer engine 203, according to an instruction from the controller 202, the printer engine 203 drives the separation mechanisms between the photosensitive drums 313a to 313d and the charging rollers 311a to 311d contacting with the photosensitive drums, the development rollers 312a to 312d, and the intermediate transfer belt 306, and the separation mechanism between the fixing roller 308 and the pressure roller 309 to set the individual components from the connected state to the separated state respectively. Meanwhile, in a power-on state, as a part of startup processing, the printer engine 203 drives the individual separation mechanisms to set the components from the separated state to the connected state to prepare for a print instruction from the controller.

<Operation of Controller and Printer Engine>

With reference to FIGS. 4 to 7, operation of the controller 202 and the printer engine 203 according to the exemplary embodiment is described.

Figure 4:
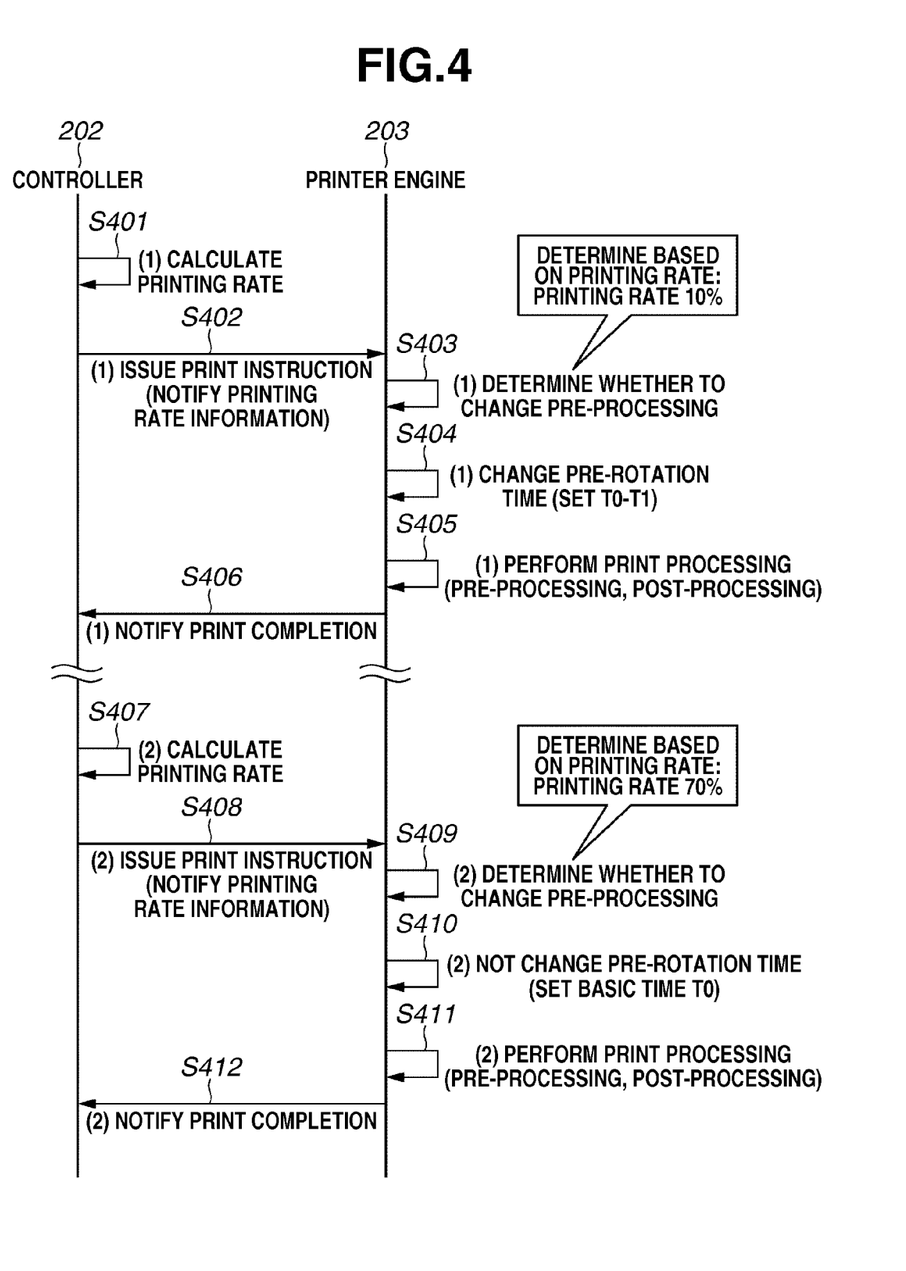
FIG. 4 illustrates a sequence of a method of controlling the image forming apparatus.

FIG. 4 illustrates a sequence of a method of controlling the image forming apparatus according to the exemplary embodiment. In this example, pre-processing changing control based on the printing rate performed in the controller 202 and the printer engine 203 is described. In the image forming apparatus according to the exemplary embodiment, the printer engine 203 includes a controller for a printer engine different from the controller 202.

In step S401, the controller 202 converts print data obtained by analyzing, for example, PDL data received from the data processing apparatus 102 into bitmap data, and calculates the printing rate. In step S402, the controller 202 issues a print instruction to the printer engine 203. In this step, together with the print instruction, the controller 202 notifies the printer engine 203 of printing rate information of a corresponding page. In step S402, a case where the calculated printing rate is 10% is described.

In step S403, to the print instruction from the controller 202, the printer engine controller 250 determines whether to perform the pre-processing change based on the printing rate. In step S404, the printer engine controller 250 changes the pre-processing. Specifically, the printing rate calculated by the controller 203 is 10%, and then, the printer engine controller 250 in the printer engine controller 203 sets the basic time T0-T1 to pre-rotation time.

This exemplary embodiment is directed to improve the FPOT while reducing a fixing defect. Consequently, the pre-processing change content includes the pre-rotation time of the printer engine 203.

The predetermined pre-rotation processing in the pre-processing includes, in addition to fixing heater heating processing of the fixing device for performing thermal fixation processing on a sheet, control of the number of rotations of a polygonal mirror, high-pressure control, and transfer preparation. In this exemplary embodiment, the FPOT improvement can be implemented by shortening the pre-rotation time to a fixing heater heating time sufficient to reduce the fixing defect. Pre-processing units to which the pre-processing is to be performed include, as units enabling the image forming apparatus to form an image onto a sheet, the fixing device, the polygonal mirror, a drive motor for driving the polygonal mirror, a high-pressure control unit, and a transfer unit.

As a specific example of the time reduction, in this example, pre-rotation time control can be performed, in which, in a case where the printing rate is 0% to 15%, the time is reduced by T1 seconds from the basic time T0. In a case where the printing rate is 16% to 49%, the time is reduced by T2 seconds (T2<T1) from the basic time T0. In a case where the printing rate is 50% or more, the time is not reduced and the basic time T0 is used. This control is only an example, and alternatively, for example, fine control for gradually changing the reduction time for each 1% can be performed.

In this exemplary embodiment, the pre-rotation time is to be changed. Alternatively, as long as the temperature adjustment control for reducing the fixing defect is implemented, for example, a conveying speed can be switched, or temperature adjustment control time can be directly changed.

Moreover, the pre-rotation time may be changed depending on a printing mode, a paper size, and information (temperature and humidity) indicating an external environmental state. Consequently, depending on the conditions, irrespective of the printing rate, whether to perform the change can be determined.

In step S405, the printer engine controller 250 in the printer engine 203 performs the changed pre-processing, the print processing, and post-processing to complete the printing. In step S406, the printer engine controller 250 notifies the controller 202 of print completion.

Similarly, an example of processing of the second page in a state where sufficient time has been passed since the printing of the first page is described. In step S407, the controller 202 converts print data of the second page into bitmap data similarly to the first page, and calculates the printing rate. The controller 202 issues a print instruction to the printer engine controller 250 in the printer engine 203.

In step S408, together with the print instruction, the controller 202 notifies the printing rate information (in this example, the calculated printing rate of this page is 70%) of the page. In step S409, the printer engine 203, to the print instruction from the controller 202, determines whether to change the pre-processing based on the printing rate, and determines not to perform the pre-processing change. In step S410, the printer engine 203 sets the default time (sets the basic time T0) without changing the pre-rotation time.

In step S411, the printer engine controller 250 in the printer engine 203 performs the pre-processing without change, the print processing, and the post-processing to complete the printing. In step S412, the printer engine controller 250 notifies the controller 202 of the print completion.

Figure 5:
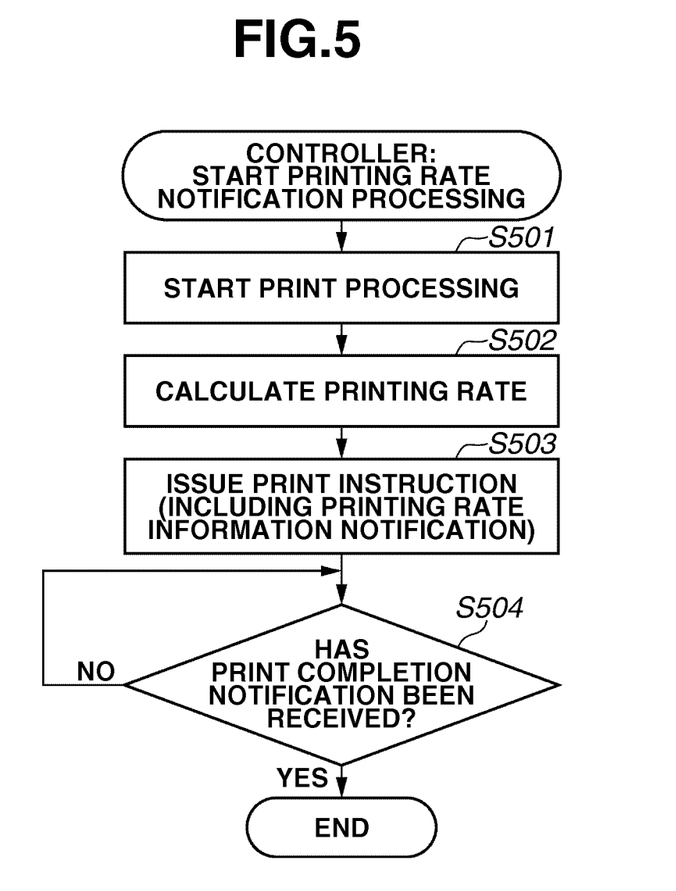
FIG. 5 is a flowchart illustrating a method of controlling the image forming apparatus.

FIG. 5 is a flowchart illustrating a method of controlling the image processing apparatus according to the exemplary embodiment. In this example, the pre-processing changing control based on the printing rate relating to the controller 202 illustrated in FIG. 1 is described. Each step is implemented by the CPU 212 by executing a control program stored in the ROM 207 to control the individual units illustrated in FIG. 2, and thereby corresponding processing is implemented. For the purpose of illustration, the timing in the sequence example in FIG. 4 is also illustrated.

In step S501, the job control unit 219 starts the print processing. The job control unit 219 generates intermediate data from print data acquired by analysis of PDL data received from the data processing apparatus 102, and further generates bitmap data. In steps S401 and S502, the image processing unit 216 calculates the printing rate from the generated bitmap data. In steps S402 and S503, the controller 202 performs setting of the DMA control unit 210, and issues a print instruction to the printer engine 203 via the engine I/F unit 209. In the processing, the DMA control unit 210 also notifies the printer engine 203 of the printing rate calculated by the image processing unit 216. In steps S406 and S504, the controller 202 waits for a print completion notification from the printer engine 203, and completes the print processing.

Figure 6:
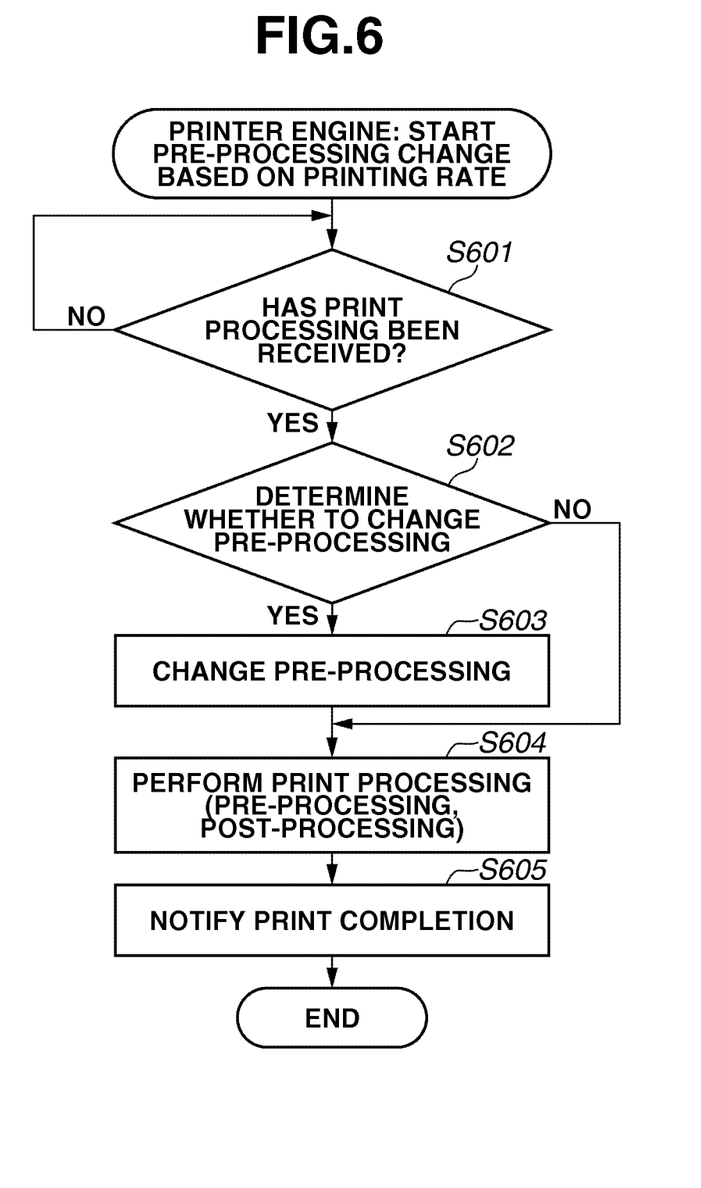
FIG. 6 is a flowchart illustrating a method of controlling the image forming apparatus.

FIG. 6 is a flowchart illustrating a method of controlling the image processing apparatus according to the exemplary embodiment. In this example, the pre-processing changing control based on the printing rate relating to the printer engine 203 illustrated in FIG. 1 is described. Each step is implemented by the CPU in the printer engine 203 by executing a control program stored in a ROM. For the purpose of illustration, the timing in the sequence example in FIG. 4 is also illustrated.

In steps S402, S408, and S601, the printer engine controller 250 in the printer engine 203 receives a print instruction from the controller 202. In steps S403, S409, and S602, based on the notified printing rate, the printer engine controller 250 determines whether to change the pre-processing. If the pre-processing change is to be performed as in the example of step S403, in steps S404 and S603, the printer engine 203 performs necessary pre-processing change. In the example of step S404, the calculated printing rate is 10%, and consequently, the change is performed to reduce the pre-rotation time to the time T0-T1.

Meanwhile, as in the example of S409 illustrated in FIG. 4, if the calculated printing rate is 70%, in step S410, the normal pre-processing setting is performed. In the example of S410, as the pre-rotation time, the time T0, which is the default value, is set. In step S604, the printer engine 203 performs the pre-processing, the print processing, and the post-processing. In step S605, the printer engine controller 250 in the printer engine 203 notifies the controller 202 of the print completion, and the printing ends.

<Operation of Controller>

In the first exemplary embodiment, in the controller 202, the printing rate calculation (S401) is always performed in all print pages. To prevent the FPOT degradation due to the printing rate calculation, however, the control for performing the printing rate calculation can be performed only in a necessary case. Hereinafter, such exemplary embodiment is described.

Figure 7:
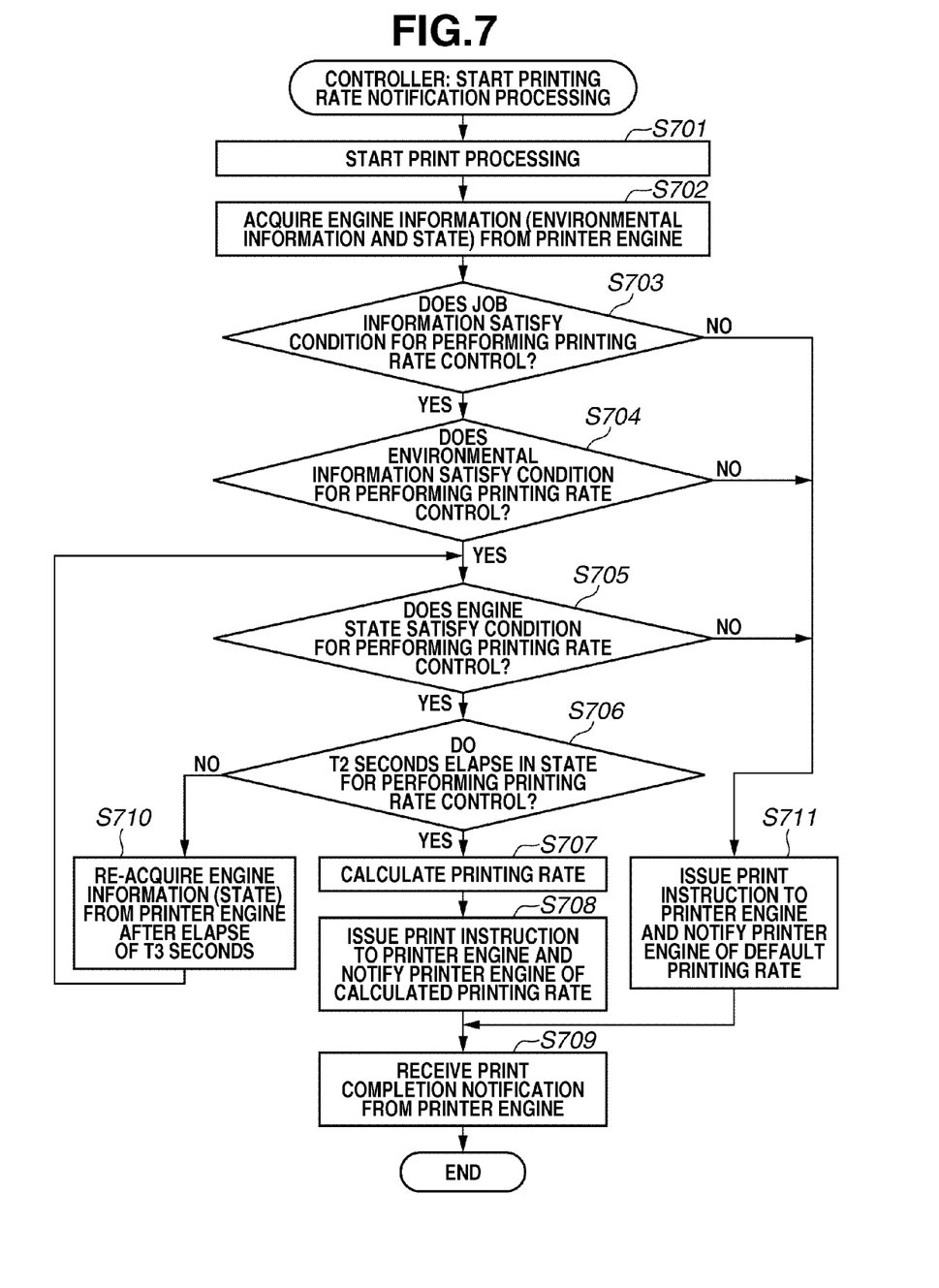
FIG. 7 is a flowchart illustrating a method of controlling the image forming apparatus.

FIG. 7 is a flowchart illustrating a method of controlling the image processing apparatus according to the exemplary embodiment. In this example, printing rate notification processing relating to the controller 202 illustrated in FIG. 1 is described. Each step is implemented by the CPU 212 by executing a control program stored in the ROM 207 to control the individual units illustrated in FIG. 2, and thereby corresponding processing is implemented.

In step S701, the job control unit 219 starts the print processing. The job control unit 219 generates intermediate data from print data acquired by analysis of PDL data received from the data processing apparatus 102, and further generates bitmap data. In step S702, the engine I/F unit 209 acquires engine information (environmental information and state) from the printer engine 203. The environmental information includes information about temperature and humidity, and further, parameters necessary for the engine control can be acquired. The state indicates a state of the engine. The state includes an initial state, a waiting state, a standby state, a print state, a sleep state, and a fault state. The job control unit 219 determines whether to perform the printing rate calculation based on the engine information and the job information.

In step S703, the job control unit 219 determines whether to perform the engine control based on the printing rate from the job information. For example, the engine control based on the printing rate is to be performed to reduce the fixing defect due to insufficient temperature of the fixing heater. Consequently, the engine control is not necessary for the second page and after the second page in continuous printing.

Accordingly, whether to perform the engine control can be determined depending on whether the page is the first page in the job. In step S704, the job control unit 219 determines whether to perform the engine control based on the printing rate from the acquired environmental information. If the job control unit 219 determines that the engine control is not necessary (NO in step S704), the calculation of the printing rate is not performed. Then, in step S711, the job control unit 219 sets the default value, sends the information to the printer engine controller 250 in the printer engine 203, and performs control similar to that in the first exemplary embodiment. With respect to the default value, if the FPOT is prioritized, the printing rate can be set to zero percent. On the other hand, if the fixing defect is prioritized, the printing rate can be set to 100%.

The setting of the printing rate can be selected by the user. Threshold values of the environmental information of temperature and humidity vary depending on the state of the printer engine.

In step S704, if the job control unit 219 determines that the engine control is to be performed (YES in step S704) from the environmental information. In step S705, the job control unit 219 further determines whether the acquired engine state needs the engine control. For example, the engine state includes states the fixing temperature is low such as a waiting state, a sleep state, and a fault state. If the conditions for the engine state are satisfied (YES in step S705), the job control unit 219 determines whether a predetermined period of time (T2 seconds) has elapsed in the state. The predetermined period of time (T2 seconds) is a value determined based on characteristics of the printer engine and characteristics of the fixing device.

If the job control unit 219 determines that the predetermined period of time has not elapsed (NO in step S706), in step S710, the job control unit 219 repeats the acquisition of the printer engine information and the determination again in an appropriate interval (T3 seconds).

On the other hand, in step S706, if the job control unit 219 determines T2 seconds has elapsed (YES in step 706), in step S707, the job control unit 219 performs the printing rate calculation. In steps S707, S708, and S709, control similar to that in the first exemplary embodiment is performed.

<Operation of Controller and Printer Engine>

In the second exemplary embodiment, the controller 202 acquires the environmental information and the engine state from the printer engine controller 250 in the printer engine 203, and the controller 202 determines whether the printing rate calculation is to be performed from the information and the state. Alternatively, control can be performed such that the printer engine 203 performs and completes the determination.

In this exemplary embodiment, if whether to change the set printing rate is determined based on an operating state of the engine and an environmental state, the printer engine controller 250 requests the controller 202 to notify a printing rate to be changed. After the request, based on the printing rate notified from the controller 202, the printer engine controller 250 extends the pre-processing time.

Specifically, the controller 202 makes an inquiry about the determination result to the printer engine controller 250 in the printer engine 203. The printer engine 203 notifies the controller 202 of only whether to perform the printing rate calculation based on the engine state and the job information including the environmental information and the elapsed time. The controller 202, based on the notified result, executes the printing rate calculation and performs setting of the printing rate to be notified to the printer engine 203.

In the above-described exemplary embodiments, by extending the pre-rotation time, the thermal fixing defect can be solved. Alternatively, when the printing rate is notified from the controller 202, the printer engine controller 250 may determine whether to switch the conveyance speed of the sheet on which the developer has been applied to a low speed, and change the conveyance speed as necessary.

Such control can increase the stability of a fixation state of the developer transferred onto the sheet.

When the controller 202 completes processing of rasterizing the data into printable image data, the controller 202 checks whether the printer engine 203 starts the post-rotation processing based on a condition 1 and a condition 2. The condition 1 to be checked in the processing is that T1+T2<T3, assuming an elapsed time from paper discharge completion time of the previous page to PDL+raster image processor (RIP) completion of the next page is T1, an image transfer preparation time calculated based on print data size, or the like is T2, and a post-rotation allowance time is T3. The condition 2 is that at the time when PDL+RIP processing is completed, the printer engine 203 is waiting for a reservation for printing start.

If the controller 202 has checked that the printer engine 203 starts the post-rotation processing, then, the controller 202 may perform control to notify the printer engine controller 250 of the calculated printing rate. In the processing, after the post-rotation, in addition to the normal pre-rotation processing, the printer engine controller 250 performs the control of extending the pre-rotation.

According to the above-described exemplary embodiments, the pre-processing time appropriate for the printing rate can be set and the time for acquiring the first page output in print request can be shortened.

Further, the pre-rotation time can be changed depending on the printing rate of print data. Consequently, by indirectly optimizing the temperature adjustment control, the time (FPOT) for acquiring the first page output can be set to an appropriate time depending on the print data, while the fixing defect can be reduced.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-269396 filed Dec. 10, 2012, which is hereby incorporated by reference herein in its entirety.

What is claimed is:

1. A printing apparatus that performs, before forming an image on a sheet, pre-rotation processing including at least heating of a fixing unit, the printing apparatus comprising:
   a controller; and
   a printer engine, wherein the printer engine comprises:
      a receiving unit configured to receive a print instruction from the controller;
      a determining unit configured to determine whether or not it is necessary to reduce a performing time of the pre-rotation processing such that the performing time becomes shorter than a default time, based on information included in the received print instruction; and
      a processing unit configured to perform the pre-rotation processing for the default time in a case where the determining unit determines that it is unnecessary to reduce the performing time of the pre-rotation processing such that the performing time becomes shorter than the default time, and perform the pre-rotation processing for a time shorter than the default time in a case where the determining unit determines that it is necessary to reduce the performing time of the pre-rotation processing such that the performing time becomes shorter than the default time.

2. The printing apparatus according to claim 1,
   wherein, in a case where the information included in the received print instruction satisfies a first condition, the determining unit determines that it is necessary to reduce the performing time of the pre-rotation processing such that the performing time becomes shorter by a first time than the default time;
   wherein, in a case where the information included in the received print instruction satisfies a second condition, the determining unit determines that it is necessary to reduce the performing time of the pre-rotation processing such that the performing time becomes shorter by a second time than the default time; and
   wherein, in a case where the information included in the received print instruction satisfies a third condition, the determining unit determines that it is unnecessary to reduce the performing time of the pre-rotation processing such that the performing time becomes shorter than the default time.

3. The printing apparatus according to claim 1, wherein the pre-rotation processing further includes a rotation control of a polygonal mirror.

4. A method for controlling a printing apparatus that performs, before forming an image on a sheet, pre-rotation processing including at least heating of a fixing unit, the method comprising:
   receiving a print instruction;
   determining whether or not it is necessary to reduce a performing time of the pre-rotation processing such that the performing time becomes shorter than a default time, based on information included in the received print instruction; and
   performing the pre-rotation processing for the default time in a case where the determining unit determines that it is unnecessary to reduce the performing time of the pre-rotation processing such that the performing time becomes shorter than the default time, and perform the pre-rotation processing for a time shorter than the default time in a case where the determining unit determines that it is necessary to reduce the performing time of the pre-rotation processing such that the performing time becomes shorter than the default time.

5. A non-transitory storage medium for storing a program for causing a computer to execute a method of controlling a printing apparatus that performs, before forming an image on a sheet, pre-rotation processing including at least heating of a fixing unit, the method comprising:
   receiving a print instruction;
   determining whether or not it is necessary to reduce a performing time of the pre-rotation processing such that the performing time becomes shorter than a default time, based on information included in the received print instruction; and
   performing the pre-rotation processing for the default time in a case where the determining unit determines that it is unnecessary to reduce the performing time of the pre-rotation processing such that the performing time becomes shorter than the default time, and perform the pre-rotation processing for a time shorter than the default time in a case where the determining unit determines that it is necessary to reduce the performing time of the pre-rotation processing such that the performing time becomes shorter than the default time.

* * * * *